United States Patent
Pelley et al.

(10) Patent No.: US 8,533,021 B2
(45) Date of Patent: *Sep. 10, 2013

(54) SYSTEM AND METHOD FOR REMOTELY REPAIRING AND MAINTAINING A TELECOMMUNICATION SERVICE USING SERVICE RELATIONSHIPS AND SERVICE MANAGEMENT SYSTEM EMPLOYING THE SAME

(75) Inventors: Edward S. Pelley, Cedar Park, TX (US); Bipin H. Shah, Austin, TX (US)

(73) Assignee: Alcatel Lucent, Paris (FR)

( * ) Notice: Subject to any disclaimer, the term of this patent is extended or adjusted under 35 U.S.C. 154(b) by 855 days.

This patent is subject to a terminal disclaimer.

(21) Appl. No.: 12/276,279

(22) Filed: Nov. 21, 2008

(65) Prior Publication Data

US 2009/0132324 A1 May 21, 2009

Related U.S. Application Data

(60) Provisional application No. 60/989,730, filed on Nov. 21, 2007.

(51) Int. Cl.
*G06Q 10/00* (2012.01)
(52) U.S. Cl.
USPC .......................... 705/7.22; 705/305; 705/7.12
(58) Field of Classification Search
USPC .......................... 714/26; 705/7.12, 7.22, 305
See application file for complete search history.

(56) References Cited

U.S. PATENT DOCUMENTS

| | | | |
|---|---|---|---|
| 5,428,619 A | 6/1995 | Schwartz et al. | |
| 5,761,288 A | 6/1998 | Pinard et al. | |
| 5,777,549 A | 7/1998 | Arrowsmith et al. | |
| 5,877,766 A | 3/1999 | Bates et al. | |
| 5,883,956 A | 3/1999 | Le et al. | |
| 6,040,834 A | 3/2000 | Jain et al. | |
| 6,122,639 A | 9/2000 | Babu et al. | |
| 6,138,122 A | 10/2000 | Smith et al. | |
| 6,286,047 B1 * | 9/2001 | Ramanathan et al. | 709/224 |
| 6,317,438 B1 | 11/2001 | Trebes, Jr. | |
| 6,343,287 B1 | 1/2002 | Kumar et al. | |

(Continued)

FOREIGN PATENT DOCUMENTS

| | | |
|---|---|---|
| WO | 0235312 A2 | 5/2002 |
| WO | 03045006 A1 | 5/2003 |
| WO | 2007039833 A1 | 4/2007 |
| WO | 2007110090 A1 | 10/2007 |

OTHER PUBLICATIONS

Dholakia, et al.; "Service Management System and Method of Operation thereof"U.S. Appl. No. 12/276,254, filed Nov. 21, 2008.

(Continued)

*Primary Examiner* — Johnna Loftis
(74) *Attorney, Agent, or Firm* — Hitt Gaines, P.C.

(57) ABSTRACT

A service management system and method. In one embodiment, the service management system includes: (1) a service description repository configured to contain service descriptions that define services in terms of a set of systems and devices that assume roles based on at least one of capabilities and attributes thereof and (2) a service management engine coupled to the service description repository and configured to employ one of the service descriptions to repair a corresponding one of the services using a predefined relationship among a subscriber, at least one of the systems and devices and optimal values.

15 Claims, 8 Drawing Sheets

(56) References Cited

U.S. PATENT DOCUMENTS

| | | |
|---|---|---|
| 6,400,689 B1 | 6/2002 | Sato et al. |
| 6,442,542 B1 | 8/2002 | Ramani et al. |
| 6,615,367 B1 | 9/2003 | Unkle et al. |
| 6,650,949 B1 | 11/2003 | Fera et al. |
| 6,742,141 B1 | 5/2004 | Miller |
| 6,813,501 B2 | 11/2004 | Kinnunen et al. |
| 6,857,075 B2 | 2/2005 | Patel |
| 6,966,015 B2 | 11/2005 | Steinberg et al. |
| 7,013,461 B2 | 3/2006 | Hellerstein et al. |
| 7,100,085 B2 | 8/2006 | Miller |
| 7,117,526 B1 | 10/2006 | Short |
| 7,143,152 B1 | 11/2006 | Elman et al. |
| 7,231,377 B2 | 6/2007 | Soluk et al. |
| 7,243,306 B1 | 7/2007 | Joshi et al. |
| 7,350,115 B2 | 3/2008 | Mathew et al. |
| 7,421,516 B2 | 9/2008 | Minogue et al. |
| 7,478,151 B1 | 1/2009 | Maiocco et al. |
| 7,480,736 B2 | 1/2009 | Busch et al. |
| 7,496,893 B2 | 2/2009 | Mohindra et al. |
| 7,502,793 B2 | 3/2009 | Snible et al. |
| 7,539,907 B1 | 5/2009 | Johnsen et al. |
| 7,574,660 B2 | 8/2009 | Campbell et al. |
| 7,610,045 B2 | 10/2009 | Little et al. |
| 7,664,022 B2 | 2/2010 | Hu |
| 7,665,125 B2 | 2/2010 | Heard et al. |
| 7,689,583 B2 | 3/2010 | Bozich et al. |
| 7,707,133 B2 | 4/2010 | Das et al. |
| 7,757,261 B2 | 7/2010 | Addington et al. |
| 7,913,290 B2 | 3/2011 | Ohta et al. |
| 8,046,585 B2 | 10/2011 | Parkinson |
| 8,051,176 B2 | 11/2011 | Thomas et al. |
| 8,051,381 B2 | 11/2011 | Ebrom et al. |
| 2002/0073195 A1 | 6/2002 | Hellerstein et al. |
| 2002/0082819 A1 | 6/2002 | Ferguson et al. |
| 2002/0087671 A1 | 7/2002 | Weisser, Jr. et al. |
| 2002/0120746 A1 | 8/2002 | Patil et al. |
| 2002/0123849 A1 | 9/2002 | Quaintance et al. |
| 2002/0147801 A1 | 10/2002 | Gullotta et al. |
| 2003/0018792 A1 | 1/2003 | Shiouchi et al. |
| 2003/0084135 A1 | 5/2003 | Narain |
| 2003/0110250 A1 | 6/2003 | Schnitzer et al. |
| 2003/0135596 A1 | 7/2003 | Moyer et al. |
| 2003/0158855 A1 | 8/2003 | Farnham et al. |
| 2003/0162529 A1 | 8/2003 | Noblins |
| 2003/0216766 A1 | 11/2003 | Wiener et al. |
| 2004/0003042 A1 | 1/2004 | Horvitz et al. |
| 2004/0003058 A1 | 1/2004 | Trossen |
| 2004/0039803 A1 | 2/2004 | Law |
| 2004/0054670 A1 | 3/2004 | Noff et al. |
| 2004/0078725 A1 | 4/2004 | Little et al. |
| 2004/0153536 A1 | 8/2004 | Strassner |
| 2004/0199576 A1 | 10/2004 | Tan |
| 2004/0215711 A1 | 10/2004 | Martin, Jr. et al. |
| 2004/0249927 A1 | 12/2004 | Pezutti |
| 2005/0005005 A1 | 1/2005 | Styles et al. |
| 2005/0071482 A1 | 3/2005 | Gopisetty et al. |
| 2005/0078172 A1 | 4/2005 | Harville et al. |
| 2005/0172162 A1 | 8/2005 | Takahashi et al. |
| 2005/0177622 A1 | 8/2005 | Spielman et al. |
| 2005/0198247 A1 | 9/2005 | Perry et al. |
| 2005/0234873 A1* | 10/2005 | Milligan et al. .......... 707/3 |
| 2005/0276229 A1 | 12/2005 | Torabi |
| 2005/0278309 A1 | 12/2005 | Evans et al. |
| 2006/0072451 A1 | 4/2006 | Ross |
| 2006/0123393 A1 | 6/2006 | Atkins et al. |
| 2006/0133296 A1* | 6/2006 | Berthaud et al. .......... 370/252 |
| 2006/0177058 A1 | 8/2006 | Sarwono et al. |
| 2006/0179116 A1* | 8/2006 | Speeter et al. .......... 709/217 |
| 2006/0184615 A1 | 8/2006 | Park et al. |
| 2006/0217113 A1 | 9/2006 | Rao et al. |
| 2006/0259274 A1 | 11/2006 | Greco et al. |
| 2007/0011605 A1 | 1/2007 | Dumitru et al. |
| 2007/0016638 A1 | 1/2007 | Elbury et al. |
| 2007/0016676 A1 | 1/2007 | Breuer et al. |
| 2007/0078970 A1 | 4/2007 | Zabihi et al. |
| 2007/0118881 A1 | 5/2007 | Mitchell et al. |
| 2007/0129145 A1* | 6/2007 | Blackburn et al. .......... 463/42 |
| 2007/0150934 A1 | 6/2007 | Fiszman et al. |
| 2007/0156872 A1 | 7/2007 | Stoyanova |
| 2007/0220521 A1* | 9/2007 | Chevanne et al. .......... 718/104 |
| 2007/0223523 A1 | 9/2007 | Montpetit et al. |
| 2007/0226540 A1 | 9/2007 | Konieczny |
| 2007/0281691 A1 | 12/2007 | Svensson |
| 2007/0290831 A1 | 12/2007 | Kalinichenko et al. |
| 2007/0294405 A1 | 12/2007 | Mohindra et al. |
| 2007/0294668 A1 | 12/2007 | Mohindra et al. |
| 2008/0046978 A1 | 2/2008 | Rieger |
| 2008/0065455 A1 | 3/2008 | Sun et al. |
| 2008/0066148 A1 | 3/2008 | Lim |
| 2008/0066151 A1 | 3/2008 | Thomsen et al. |
| 2008/0109868 A1 | 5/2008 | Waris |
| 2008/0133734 A1 | 6/2008 | Jacobs et al. |
| 2008/0141137 A1 | 6/2008 | Cleary et al. |
| 2008/0148339 A1 | 6/2008 | Hill et al. |
| 2008/0155643 A1 | 6/2008 | Moran et al. |
| 2008/0256593 A1 | 10/2008 | Vinberg et al. |
| 2008/0280609 A1 | 11/2008 | Imbimbo et al. |
| 2009/0037425 A1 | 2/2009 | Erickson et al. |
| 2009/0083765 A1 | 3/2009 | Davis et al. |
| 2010/0061316 A1 | 3/2010 | Levenshteyn et al. |
| 2010/0107225 A1 | 4/2010 | Spencer et al. |
| 2011/0276684 A1 | 11/2011 | Singh et al. |

OTHER PUBLICATIONS

Dholakia, et al.; "System and Method for Identifying and Calling a Function of a Service with Respect to a Subscriber and Service Management System Employing the Same"; U.S. Appl. No. 12/276,256, filed Nov. 21, 2008.

Pelley, et al.; "Normalization Engine and Method of Requesting a Key or Performing an Operation Pertaining to an End Point"; U.S. Appl. No. 12/276,260, filed Nov. 21, 2008.

Pelley, et al., "Service Management System and Method of Executing a Policy"; U.S. Appl. No. 12/276,262, filed Nov. 21, 2008.

Pelley, et al.; "System and Method for Generating a Visual Representation of a Service and Service Management System Employing the Same"; U.S. Appl. No. 12/276,265, filed Nov. 21, 2008.

Pelley, et al.; "System and Method for Remotely Activating a Service and Service Management System Incorporating the Same"; U.S. Appl. No. 12/276,269, filed Nov. 21, 2008.

Pelley, et al.; "Application and Method for Dynamically Presenting Data Regarding an End Point or a Service and Service Management System Employing the Same"; U.S. Appl. No. 12/276,272, filed Nov. 21, 2008.

Pelley, et al.; "Service Diagnostic Engine and Method and Service Management System Employing the Same";U.S. Appl. No. 12/276,273, filed Nov. 21, 2008.

Pelley, et al.; "Self-Service Application for a Service Management System and Method of Operation Thereof"; U.S. Appl. No. 12/276,275, filed Nov. 21, 2008.

Pelley, et al.; "Customer Service Representative Support Application for a Service Management System and Method of Operation Thereof"; U.S. Appl. No. 12/276,278, filed Nov. 21, 2008.

Pelley, et al.; "Application and Method for Generating Automated Offers of Service and Service Management System Incorporating the same"; U.S. Appl. No. 12/276,281, filed Nov. 21, 2008.

Dholakia et al.; "System and Method for Provisioning and Unprovisioning Multiple End Points with Respect to a Subscriber and Service Management System Employing the Same"; U.S. Appl. No. 12/276,286, filed Nov. 21, 2008.

Dholakia et al.; "System and Method for Identifying Functions and Data with Respect to a Service and a Subscriber and Service Management System Employing the Same" U.S. Appl. No. 12/276,287, filed Nov. 21, 2008.

Dholakia et al.; "System and Method for Invoking a Function of a Service in Response to an Event and Service Management System Employing the Same"; U.S. Appl. No. 12/276,288, filed Nov. 21, 2008.

* cited by examiner

SYSTEM AND METHOD FOR REMOTELY REPAIRING AND MAINTAINING A TELECOMMUNICATION SERVICE USING SERVICE RELATIONSHIPS AND SERVICE MANAGEMENT SYSTEM EMPLOYING THE SAME

CROSS-REFERENCE TO RELATED APPLICATION

This application claims the benefit of U.S. Provisional Application Ser. No. 60/989,730, filed by Dholakia, et al., on Nov. 21, 2007, entitled "Method and System for Remote Device Management," commonly assigned with this application and incorporated herein by reference. This application is also related to the following U.S. patent applications, which are filed on even date herewith, commonly assigned with this application and incorporated herein by reference:

| Pat. No. | Inventors | Title |
| --- | --- | --- |
| 12/276,254 | Dholakia, et. al. | "Service Management System and Method of Operation thereof" |
| 12/276,256 | Dholakia, et. al. | "System and Method for Identifying and Calling a Function of a Service With Respect to a Subscriber And Service Management System Employing the Same" |
| 12/276,260 | Pelley, et. al. | "Normalization Engine and Method of Requesting a Key Or Performing an Operation Pertaining to an End Point" |
| 12/276,262 | Pelley, et. al. | "Service Management System and Method of Executing a Policy" |
| 12/276,265 | Pelley | "System and Method for Generating a Visual Representation of a Service and Service Management System Employing the Same" |
| 12/276,269 | Pelley, et. al. | "System and Method for Remotely Activating a Service and Service Management System Incorporating the Same" |
| 12/276,272 | Pelley | "Application and Method for Dynamically Presenting Data Regarding an End Point or a Service and Service Management System Incorporating the Same" |
| 12/276,273 | Pelley, et. al. | "Service Diagnostic Engine and Method and Service Management System Employing the Same" |
| 12/276,275 | Pelley | "Self-Service Application for a Service Management System and Method of Operation Thereof" |
| 12/276,278 | Pelley | "Customer Service Representative Support Application for a Service Management System and Method of Operation Thereof" |
| 12/276,281 | Pelley, et. al. | "Application and Method for Generating Automated Offers of Service and Service Management System Incorporating the Same" |
| 12/276,286 | Dholakia, et. al. | "System and Method for Provisioning and Unprovisioning Multiple End Points With Respect to a Subscriber and Service Management System Employing the Same" |
| 12/276,287 | Dholakia, et. al. | "System and Method for Identifying Functions and Data With Respect to a Service and a Subscriber and Service Management System Employing the Same" |
| 12/276,288 | Dholakia, et. al. | "System and Method for Invoking a Function of a Service in Response to an Event and Service Management System Employing the Same" |

TECHNICAL FIELD

This application relates to remote management of fixed-line and mobile devices, and, more particularly, to activation, provisioning, support, management and assurance of consumer and business services spanning one or more fixed-line devices and one or more mobile devices.

BACKGROUND

Network service providers are called upon to support a large variety of networked devices, including devices coupled to home networks (e.g., residential gateways, set-top boxes and voice-over-IP, or VoIP, adapters) and cellular networks (e.g. smart phones and pocket computers). Given the proliferation of such devices and the distributed nature of the networks involved, remote management of such devices is highly desirable.

For example, demand for smart phones and other advanced handsets is growing faster than anticipated as users look for new ways to increase their personal and professional productivity. In 2005, year-over-year growth in the smart phone market exceeded 70%, and the industry experts expect that trend to continue for the next several years. In fact by 2009, it is estimated that smart phones will represent almost 30% of all new handsets sold—up from less than three percent in 2004.

As smart phones and services for smart phones boom, so do the challenges. Today, the complexity often associated with smart phones is driving customer service costs up and serves as a potential inhibitor as mobile network operators strive to achieve mass-market adoption with these sophisticated devices. In fact, consumers are finding mobile services increasingly confusing and issues around ease-of-use are holding them back from buying and using third generation (3G) handsets and services.

Wireless service providers who sell and support smart phones and their associated data services face the prospect of rising customer support costs due to the complexity associated with these devices and services. In 2007, the support costs for smart phones will surpass that of feature phones. The following are few of the top reasons for this support cost.

Multiple contacts are made to a helpdesk to solve a single problem.

34% of users have never solved a problem with a single contact to the helpdesk.

Calls last two to three times longer than calls from users of feature phones.

It is common practice to escalate care from a helpdesk (Tier 1) to expensive technicians (Tier 2 and Tier 3).

FMC (Fixed-Mobile Convergence) will add to the support burden. 89% of early adopters are more likely to go to CE vendors for support. Mainstream consumers are three times more likely to look to their service provider for support.

Similarly, network providers that are coupled to home networks (e.g., Digital Subscriber Link, or DSL, and cable) find those networks coupled to a variety of customer premises equipment (CPE) within the homes that are gradually becoming more and more sophisticated. Customer issues with such devices are no less taxing upon support staff and support infrastructure.

The Open Mobile Alliance (OMA) is currently defining a number of standards for managing functionality on mobile devices. These include protocols for device management (OMA-DM), client provisioning (OMA-CP), firmware updates, data synchronization (OMA-DS) and the like. Devices that support at least some of these protocols are becoming prevalent. A support solution that utilizes these protocols and provides a usable console for customer support is the only way network providers and mobile carriers can handle support for the increasing number of devices in the market.

It is therefore desirable to provide a support solution that allows centralized management and control of remotely networked devices such as smart phones and CPE using protocols established for device management, updates, data synchronization and the like.

SUMMARY

Various embodiments of a method and system for providing customer support with centralized management and control of mobile phones and customer premises equipment in order to aid users of such equipment with problems related to that equipment. In one embodiment, a user interface driven mechanism is provided to allow customer support representatives to manipulate remote devices in, for example, the following manners: access information about the remote devices and the users thereof, including history of issues with a particular device, device provisioning, access to diagnostics of a device, ability to upgrade firmware/software of a device, synchronization of data, enablement of security features, remote control of devices, service and application provisioning, defining and following policies related to service management for a variety of devices and resetting devices. Such functionality can be provided, for example, through the use of a device management server that uses a variety of appropriate protocols to communicate with the remote devices.

Another aspect provides a service management system. In one embodiment, the service management system includes: (1) a service description repository configured to contain service descriptions that define services in terms of a set of systems and devices that assume roles based on at least one of capabilities and attributes thereof and (2) a service management engine coupled to the service description repository and configured to employ one of the service descriptions to repair a corresponding one of the services using a predefined relationship among a subscriber, at least one of the systems and devices and optimal values. In another embodiment, the service management system includes: (1) a service description repository configured to contain service descriptions that define services in terms of a set of systems and devices that assume roles based on at least one of capabilities and attributes thereof and (2) a service management engine coupled to the service description repository and configured to respond to a received event by employing one of the service descriptions to maintain a telecommunication service on at least one of the systems and devices using a predefined relationship among a subscriber and at least one of the systems and devices.

Yet another aspect provides a method of remotely repairing a telecommunication service. In one embodiment, the method includes: (1) receiving information identifying a subscriber and the service, (2) identifying end points associated with the subscriber, (3) mapping the end points into roles in the service and (4) repeating, for each of the end points: (4a) determining attributes regarding the each of the end points, (4b) retrieving the attributes and optimal values corresponding thereto and (4c) reprovisioning ones of the attributes based on a comparison therebetween and ones of the optimal values.

Still another aspect provides a method of remotely maintaining a telecommunication service. In one embodiment, the method includes: (1) receiving an alert, (2) associating a subscriber with the alert, (3) retrieving service descriptions corresponding to subscriptions associated with the subscriber and (4) repeating, for each of the service descriptions: (4a) determining whether the alert matches an alert type in the each of the service descriptions and (4b) causing a function associated with the alert to be executed.

BRIEF DESCRIPTION

Reference is now made to the following descriptions taken in conjunction with the accompanying drawings, in which.

DETAILED DESCRIPTION

The following is intended to provide a detailed description of an example of the invention and should not be taken to be limiting of the invention itself. Rather, any number of variations may fall within the scope of the invention which is defined in the claims following the description. The use of the same reference symbols in different drawings indicates similar or identical items.

Introduction

Described herein are various embodiments of a management system that allows users to create, define and maintain services by defining the roles of its constituent devices and systems. Certain of the embodiments have the ability to map a given set of device and systems into roles. The roles may then be used to select key/value pairs, alerts and management function from each device. Certain of the embodiments allow relationships to be specified between roles and between other services. Using the roles and relationships as a lens upon the service's constituent devices, service-wide key/value pairs, alerts and management functions may be created.

In various embodiments to be described and illustrated herein, a method, apparatus and process are disclosed that allow for activation, provisioning, support (by call center, functions or self), management (by call center, functions or self) and assurance of consumer and business services spanning one or more fixed-line devices and one or more mobile devices, such as PCs, AAA servers, email servers, web servers and devices of every kind. Before describing the embodiments, an example computing and network environment within which the embodiments may operate will be described.

An Example Computing and Network Environment

Figure 1:
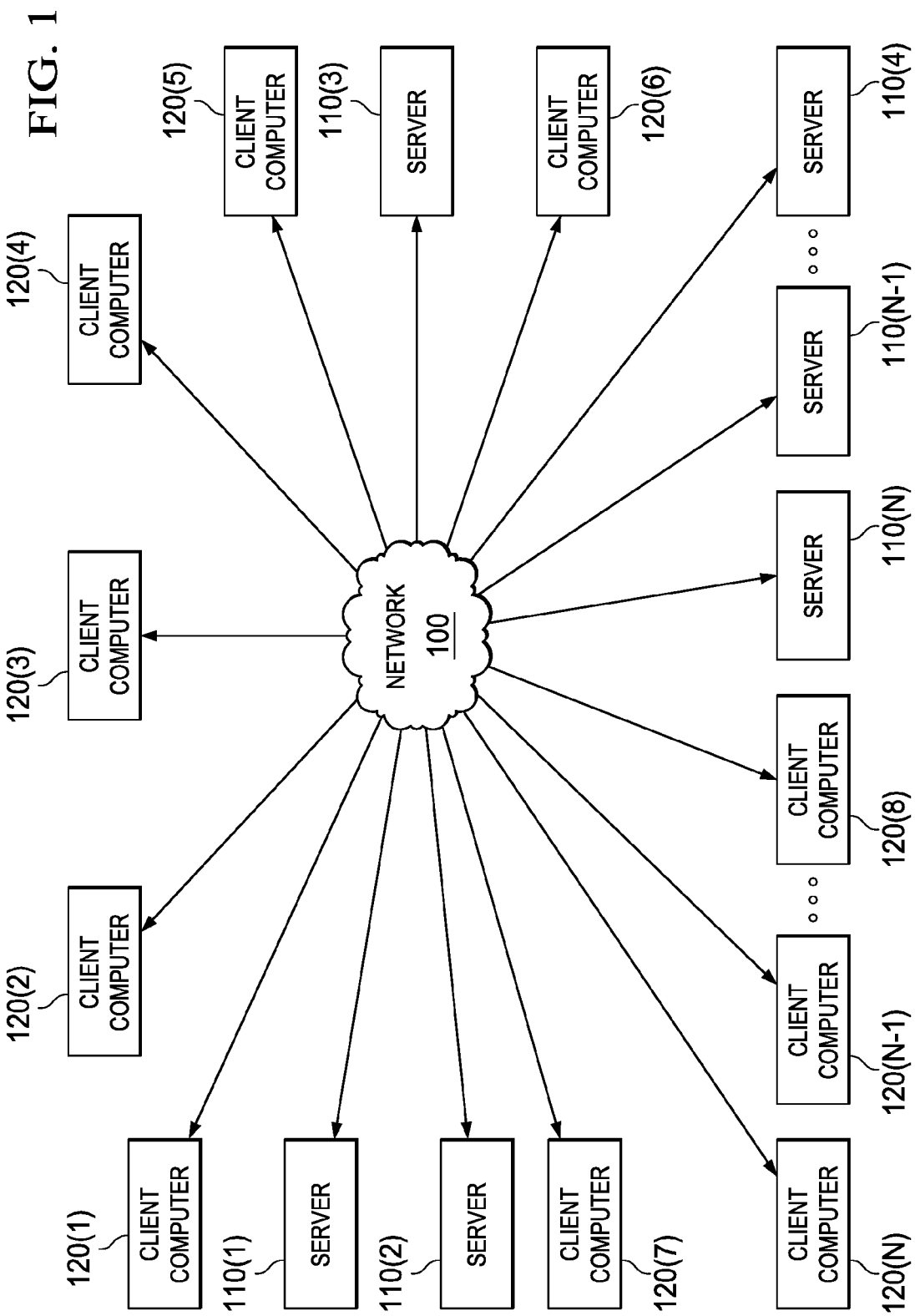
FIG. 1 is a block diagram illustrating a network environment in which commercial transaction processing according to embodiments of the invention may be practiced.

FIG. 1 is a block diagram illustrating a network environment in which a system according to the invention may be practiced. As is illustrated in FIG. 1, network 100, such as a private wide area network (WAN) or the Internet, includes a number of networked servers 110(1)-(N) that are accessible by client computers 120(1)-(N).

Communication between the client computers 120(1)-(N) and the servers 110(1)-(N) typically occurs over a publicly accessible network, such as a public switched telephone network (PSTN), a DSL connection, a cable modem connection or large bandwidth trunks (e.g., communications channels providing T1 or OC3 service). The client computers 120(1)-(N) access the servers 110(1)-(N) through, for example, a service provider. This might be, for example, an Internet Service Provider (ISP) such as America On-Line™, Prodigy™, CompuServe™ or the like. Access is typically had by executing application specific software (e.g., network connection software and a browser) on the given one of the client computers 120(1)-(N).

One or more of the client computers 120(1)-(N) and/or one or more of the servers 110(1)-(N) may be, for example, a computer system of any appropriate design, in general, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or a plurality of I/O devices (i.e., peripheral devices) which are coupled to the system processor and which perform specialized functions. Examples of I/O devices include modems, sound and video devices and specialized communication devices. Mass storage devices such as hard disks, CD-ROM drives and magneto-optical drives may also be provided, either as an integrated or peripheral device. One such example computer system, discussed in terms of the client computers 120(1)-(N), is shown in detail in FIG. 2.

It will be noted that the variable identifier "N" is used in several instances in FIG. 1 to more simply designate the final element (e.g., the servers 110(1)-(N) and the client computers 120(1)-(N)) of a series of related or similar elements (e.g., servers and client computers). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identifier by "N" may hold the same or a different value than other instances of the same variable identifier.

Figure 2:
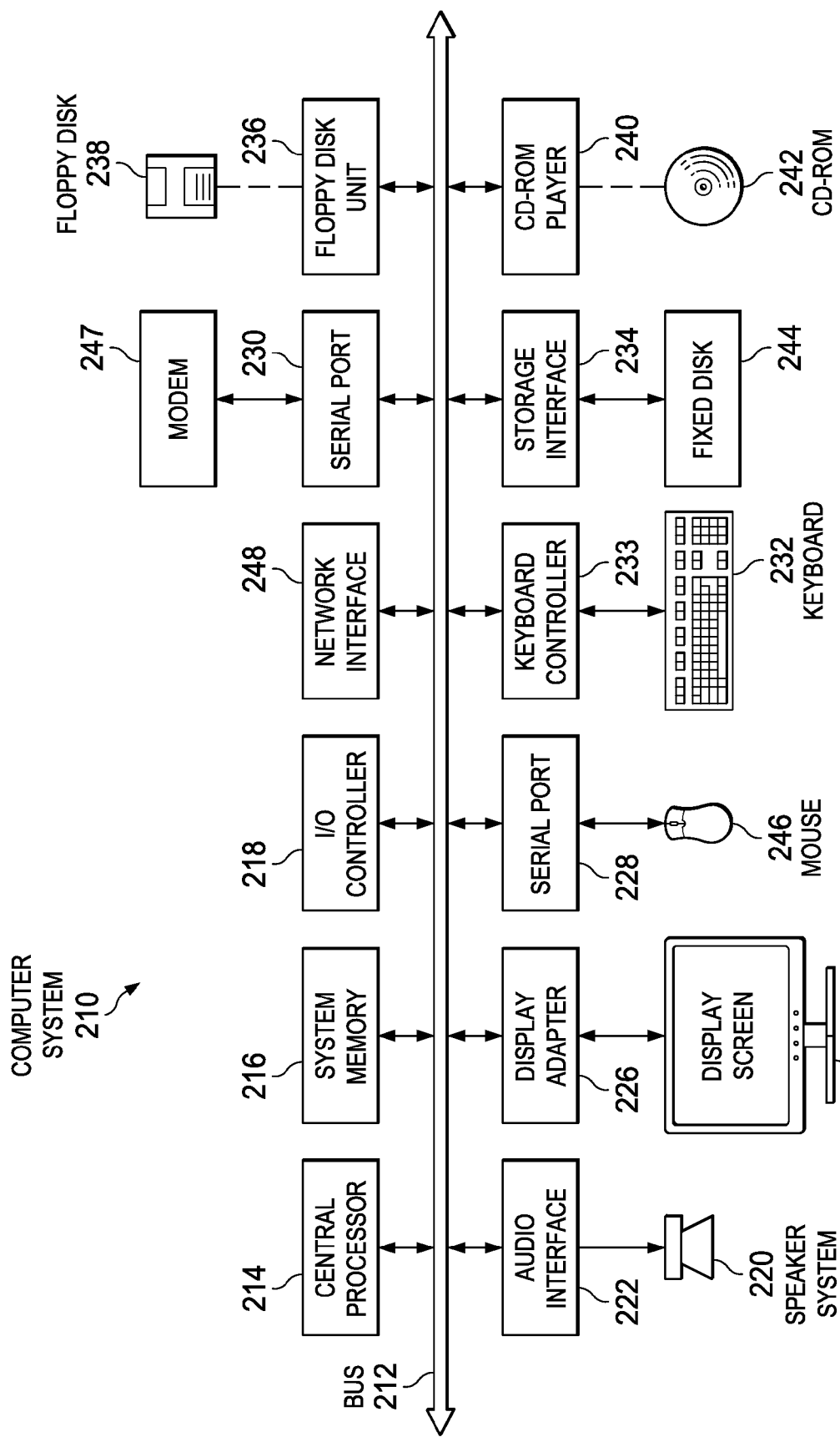
FIG. 2 is a block diagram illustrating a computer system suitable for implementing embodiments of the invention.

FIG. 2 depicts a block diagram of a computer system 210 suitable for implementing the invention and example of one or more of the client computers 120(1)-(N). A computer system 210 includes a bus 212 which interconnects major subsystems of the computer system 210 such as a central processor 214, a system memory 216 (typically random-access memory, or RAM, but which may also include read-only memory, or ROM, flash RAM, or the like), an input/output controller 218, an external audio device such as a speaker system 220 via an audio output interface 222, an external device such as a display screen 224 via a display adapter 226, serial ports 228, 230, a keyboard 232 (interfaced with a keyboard controller 233), a storage interface 234, a floppy disk drive 236 operative to receive a floppy disk 238 and a CD-ROM drive 240 operative to receive a CD-ROM 242. Also included are a mouse 246 (or other point-and-click device, coupled to the bus 212 via the serial port 228), a modem 247 (coupled to the bus 212 via the serial port 230) and a network interface 248 (coupled directly to the bus 212).

The bus 212 allows data communication between a central processor 214 and a system memory 216, which may include RAM, ROM or flash memory, as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with the computer system 210 are generally stored on and accessed via a computer readable medium, such as a hard disk drive (e.g., fixed disk 244), an optical drive (e.g., CD-ROM drive 240), a floppy disk unit 236 or other storage medium. Additionally, applications may be in the form of electronic signals modulated in accordance with the application and data communication technology when accessed via a network modem 247 or an interface 248.

The storage interface 234, as with the other storage interfaces of the computer system 210, may connect to a standard computer readable medium for storage and/or retrieval of information, such as a fixed disk drive 244. The fixed disk drive 244 may be a part of computer system 210 or may be separate and accessed through other interface systems. Many other devices can be connected, such as a mouse 246 connected to the bus 212 via serial port 228, a modem 247 connected to the bus 212 via serial port 230 and a network interface 248 connected directly to the bus 212. The modem 247 may provide a direct connection to a remote server via a telephone link or to the Internet via an internet service provider (ISP). The network interface 248 may provide a direct connection to a remote server via a direct network link to the Internet via a POP (point of presence). The network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on).

Conversely, it is not necessary for all of the devices shown in FIG. 2 to be present to practice the invention. The devices and subsystems may be interconnected in different ways from that shown in FIG. 2. The operation of a computer system such as that shown in FIG. 2 is readily known in the art and is not discussed in detail in this application. Code to implement the invention may be stored in computer-readable storage media such as one or more of the system memory 216, the fixed disk 244, the CD-ROM 242 or the floppy disk 238. Additionally, the computer system 210 may be any kind of computing device and so includes personal data assistants (PDAs), network appliance, X-window terminal or other such computing device. The operating system provided on the computer system 210 may be MS-DOS®, MS-Windows®, OS/2®, UNIX®, Linux® or other known operating system. The computer system 210 may also support a number of Internet access tools, including, for example, a Hypertext Transfer Protocol (HTTP)-compliant web browser having a JavaScript interpreter, such as Netscape Navigator® 3.0, Microsoft Explorer® 3.0 and the like.

The foregoing described embodiment wherein the different components are contained within different other components (e.g., the various elements shown as components of the computer system 210). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Figure 3:
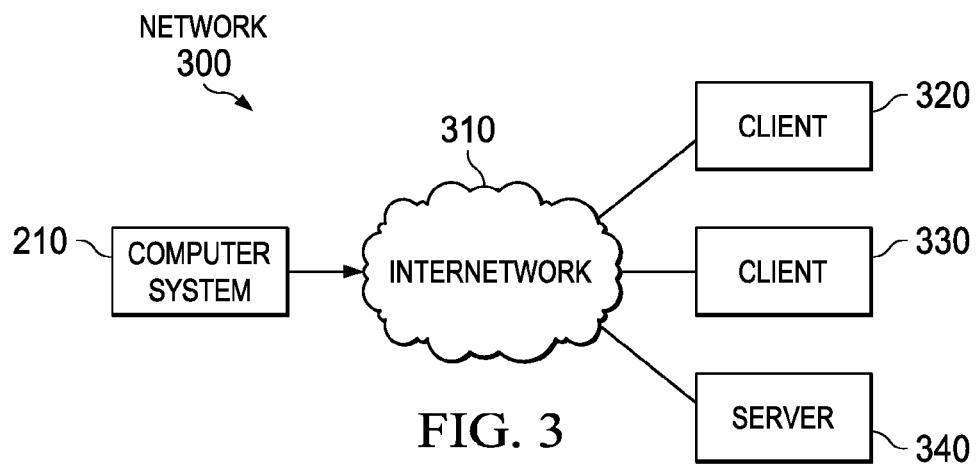
FIG. 3 is a block diagram illustrating the interconnection of the computer system of FIG. 2 to client and host systems.

FIG. 3 is a block diagram depicting a network 300 in which the computer system 210 is coupled to an internetwork 310, which is coupled, in turn, to client systems 320, 330, as well as a server 340. An internetwork 310 (e.g., the Internet or a wide-area network, or WAN) is also capable of coupling the client systems 320, 330 and the server 340 to one another. With reference to the computer system 210, the modem 247, the network interface 248 or some other method can be used to provide connectivity from the computer system 210 to the internetwork 310. The computer system 210, the client system 320 and the client system 330 are able to access information on the server 340 using, for example, a web browser (not shown). Such a web browser allows the computer system 210, as well as the client systems 320, 330, to access data on the server 340 representing the pages of a website hosted on the server 340. Protocols for exchanging data via the Internet are well known to those skilled in the art. Although FIG. 3 depicts the use of the Internet for exchanging data, the invention is not limited to the Internet or any particular network-based environment.

Referring to FIGS. 1, 2 and 3, a browser running on the computer system 210 employs a TCP/IP connection to pass a request to the server 340, which can run an HTTP "service" (e.g., under the WINDOWS® operating system) or a "daemon" (e.g., under the UNIX® operating system), for example. Such a request can be processed, for example, by contacting an HTTP server employing a protocol that can be used to communicate between the HTTP server and the client computer. The HTTP server then responds to the protocol, typically by sending a "web page" formatted as an HTML file. The browser interprets the HTML file and may form a visual representation of the same using local resources (e.g., fonts and colors).

Example Embodiments of a Service Management System

The functions referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into sub-modules to be executed as multiple computer processes and, optionally, on multiple computers. Moreover, alternative embodiments may combine multiple instances of a particular module or sub-module. Furthermore, those skilled in the art will recognize that the functions described in example embodiment are for illustration only. Operations may be combined or the functionality of the functions may be distributed in additional functions in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user using, for example, a computer system such as the computer system 210. Thus, the above described method, the functions thereof and modules therefore may be executed on a computer system configured to execute the functions of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media. optical storage media such as compact disk media (e.g., CD-ROM, CD-R, etc.) and digital video disk storage media, nonvolatile memory storage memory including semiconductor-based memory units such as flash memory, EEPROM, EPROM, ROM or application-specific integrated circuits (ASICs), volatile storage media including registers, buffers or caches, main memory, RAM and the like, and data transmission media including computer network, point-to-point telecommunication and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Before describing various embodiments of management systems constructed according to the principles of the invention, some use cases or interactions will be described that provide a framework for understanding the management systems. Various of the embodiments of the management systems are directed to addressing the following categories of use cases or interactions: service activation, service management, service interruption and resumption and service offering. Service activation refers to all the use cases that involve creating (provisioning) and deleting (unprovisioning) a new service instance, or "subscription." Service management refers to day-to-day management tasks involving a given service or subscription. Service interruption and resumption may be thought of as special types of service management that involve the loss and restoration of service. Service offering refers to new services that may be offered to a subscriber.

Figure 4:
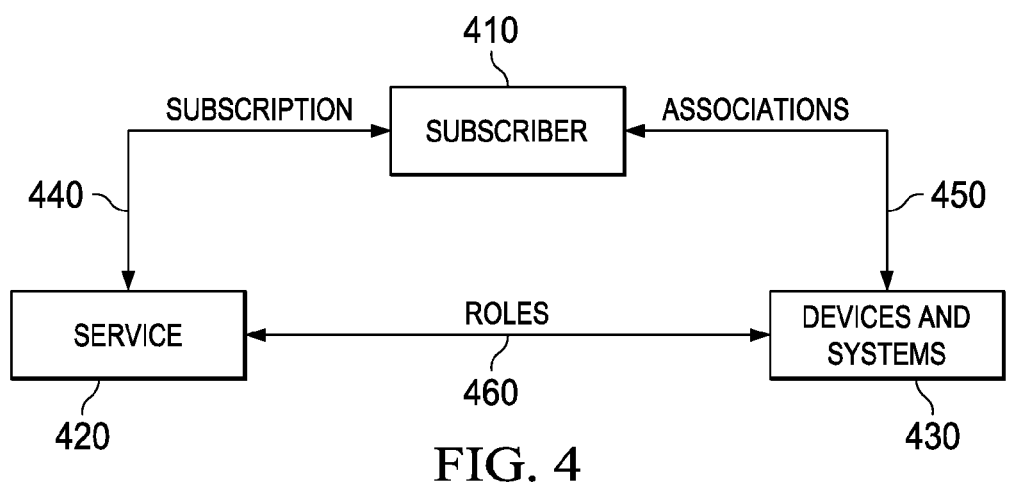
FIG. 4 is a diagram illustrating relationships that may exist among a subscriber, a service and various devices and systems.

The categories of use cases that set forth above may be illustrated with reference to FIG. 4. FIG. 4 is a diagram illustrating relationships that may exist among a subscriber 410, a service 420 and various devices and systems 430. A service provider, such as a cellular phone company, an Internet service provider, a cable television company or a combination of these, offers one or more services to subscribers that involve devices and systems such as cell phones, set-top boxes, routers, cell towers, email servers, DSLAMs, landline phones and other mobile and customer premises equipment and network infrastructure. In the context of FIG. 4, the subscriber 410 takes out a subscription 440 to a service 420 offered by a service provider. The subscription contains state and other information that is both relative to the subscriber 410 and the service 420. The subscription calls for one or more associations 450 to be made between the subscriber 410 and various devices and systems 430. The subscriber 410 may own or lease one or more devices 430. The subscriber 410 may also be associated with one or more systems 430. Once the associations 450 are made, the devices and systems 430 assume roles 460 in delivering the service 420 to the subscriber 410. The roles describe to the service management system how the device should be managed.

FIG. 4 may be employed to illustrate two example use cases: activating a device for a subscriber and managing and provisioning a subscription.

To activate a device (one of the devices and systems 430) for a subscriber 410, the following steps may be taken. First, for a given device 410, the subscriber 410 associated with that device 430 is found. This is done by employing the associations 450. Once the associated subscriber 410 has been identified, a corresponding subscription 440 may then be used to determine the service or services 420 that should be provisioned on the device 430. For each service 420 that needs to be activated on the device 430, two alternative actions may be taken. Based upon the role the device 430 plays with respect to the service 420, settings on the device 430 may be set to provision the device. Alternatively or additionally, based on the roles of other devices and systems 430 relative to the service 420, settings on the other devices and systems may be set to provision them for the new device's presence.

Managing and provisioning a subscription involves either adding a new service to a subscriber or managing an existing service. To manage and provision a subscription 440 for a subscriber 410, the following steps may be taken. First, a service 420 is added to a subscriber 410, or an existing service 420 is modified. Devices and systems 430 associated with the subscriber are collected. Then, each device associated with the service 420 is mapped into the different roles 460 in the targeted service. This reveals what actions should be taken with respect to each device or system to provision the service 420.

Another use case that is a variant on the one above is a bulk change to an existing service for all subscribers. In this use case, existing subscriptions are retrieved to obtain a list of subscribers. Then, a list of devices and systems 430 is assembled for each subscriber. Using roles, changes are then applied to the devices and systems 430 to enable the bulk change.

Figure 5:
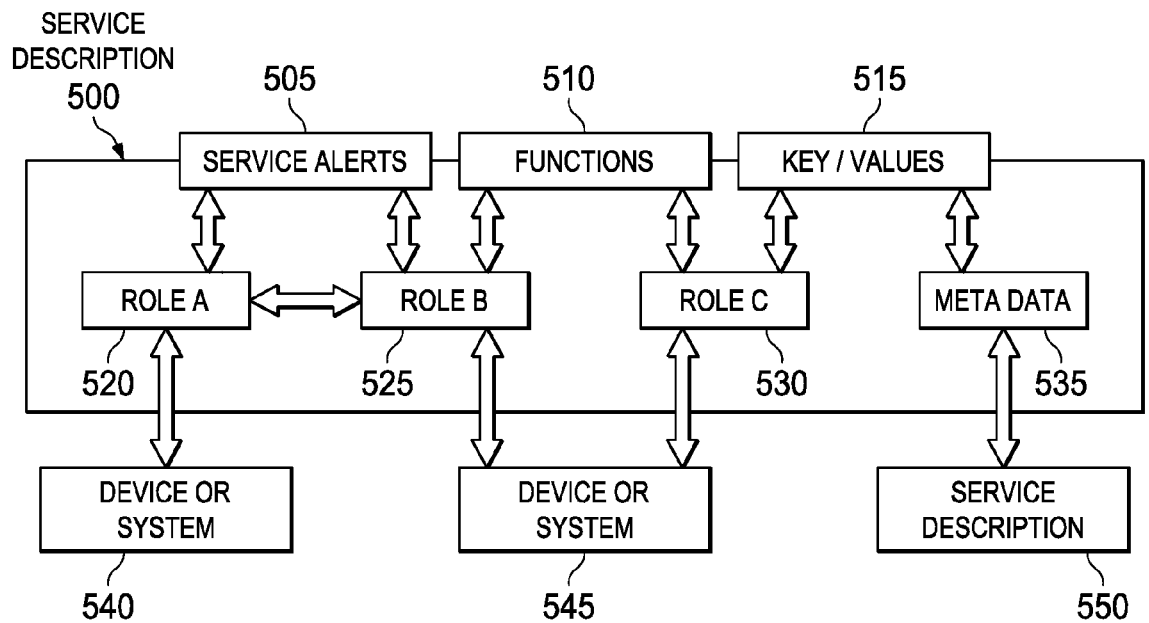
FIG. 5 is a diagram of one embodiment of a service description.

Having described various use cases, one manner in which interaction may occur among roles, devices and systems, and the service level management interfaces will now be described. FIG. 5 is a diagram of one embodiment of a service description 500. FIG. 5 shows that the service description 500 includes service alerts 505, functions 510 and key/value pairs 515. Roles are associated with the service alerts 505, the functions 510 and the key/value pairs 515. The roles, designated Role A 520, Role B 525 and Role C 530 are associated as shown with the service alerts 505, the functions 510 and the key/value pairs 515 as various arrows show. Meta data 535 is also associated with the key/value pairs 515. Devices or systems 540, 545 are associated with the roles 520, 525, 535 as various arrows show.

FIG. 5 illustrates, in the context of the service description 500, how a set of roles (e.g., the roles 520, 525, 535) can be mapped onto a set of devices and systems (e.g., the devices or systems 540, 545). The roles define the functions, alerts and functions that are of interest from each device or system. In the illustrated embodiment, the meta data 535 contains both service-wide and subscriber/subscription data that is specific to the service description. Items like level of service and current state of activation would be a part of the meta data. The alerts, functions, and key/value pairs 505. 510, 515 together constitute services supported by the devices and systems 540, 545 exposed through the roles 520, 525, 530. The service description 500 is configured to contain arbitrary, named relationships that can be used to affect a service. The service description 500 may also be configured to contain one or more references to other service with which it has relationships or upon which it has dependencies. Accordingly, a further service description 550 is associated with the meta data 535 as an arrow shows. Similar to the relationships between roles, relationships between services are exposed to the logic in the service description and to external logic associated with the service description.

Figure 6:
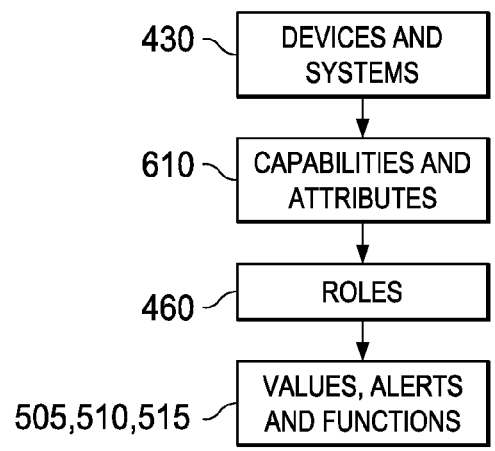
FIG. 6 is a diagram illustrating relationships that may exist among management operations, roles, capabilities and attributes.

To make a role useful, the role is matched with a device. FIG. 6 is a diagram illustrating relationships that may exist among management functions (i.e., values, alerts and functions 505, 510, 515), roles (e.g., 460), capabilities and attributes 610 and devices and systems (e.g., 430). In the embodiment of FIG. 6, the mechanism for doing this is two-fold. First, a role may be matched to a device or a system based on the known attributes of the device or system. Second, a role may be matched to a device or a system based upon the known capabilities of the device or system.

Device attributes are known aspects of the device, e.g., the type, serial number, MAC address, manufacture date, make, model, service tags, device ID or operating system of the device or system. Other attributes may include the firmware version, hardware version, embedded device, locale (language), and physical location. Device attributes, in the simplest form, could be a list of known key/value pairs associated with the device.

Capabilities are similar to device attributes. In this case, instead of a list of key/value pairs, these are a list of values (without the key) of known capabilities about the device, e.g., generic email client, Microsoft Outlook® email client, phone, router or IPTV device. Other examples include network attached storage, media server, media renderer, camera, MMS client, SMS client, wireless access provider, wireless access client, printer, GPS, vibrate, Bluetooth, USB, Wi-Fi, clock, browser, QVGA, flight mode, caller ID, touchscreen, or fax.

Both the capabilities and the attributes can be provided to or retrieved from an external system, deduced or derived from known attributes and capabilities, queried directly from the device or system or a combination of these. For example, prior knowledge may exist that any device that has a serial number from a given manufacture starting with the letter W- has built-in Wi-Fi capabilities, or that Windows® Mobile phone supports OMA-DM.

It can be determined whether a given device or system matches a role by matching its attributes and capabilities (derived, discovered, or known) against the required attributes and capabilities of a given role. Each role defines a set of key/value pairs, alerts, and functions that are relevant for devices of that role in the service description.

It should be noted that roles do not imply device type, model or brand. Direct mappings between devices and roles may occur in practice, but the mappings are flexible such that they may change as device attributes or capabilities change. For example, newer devices may support more roles than do older devices. One example of a role is a phone capable of functioning as an email client may play an "EmailClient" role in a service description associated with an email service. Other roles in an email service may include "SMTPServer," "POPServer" and "IMAPServer." Roles in a data connectivity service may include "Host," "Router," "Wireless Access Point," "Head End," "Border Gateway" and "Authentication, Authorization, Account Server."

Figure 7:
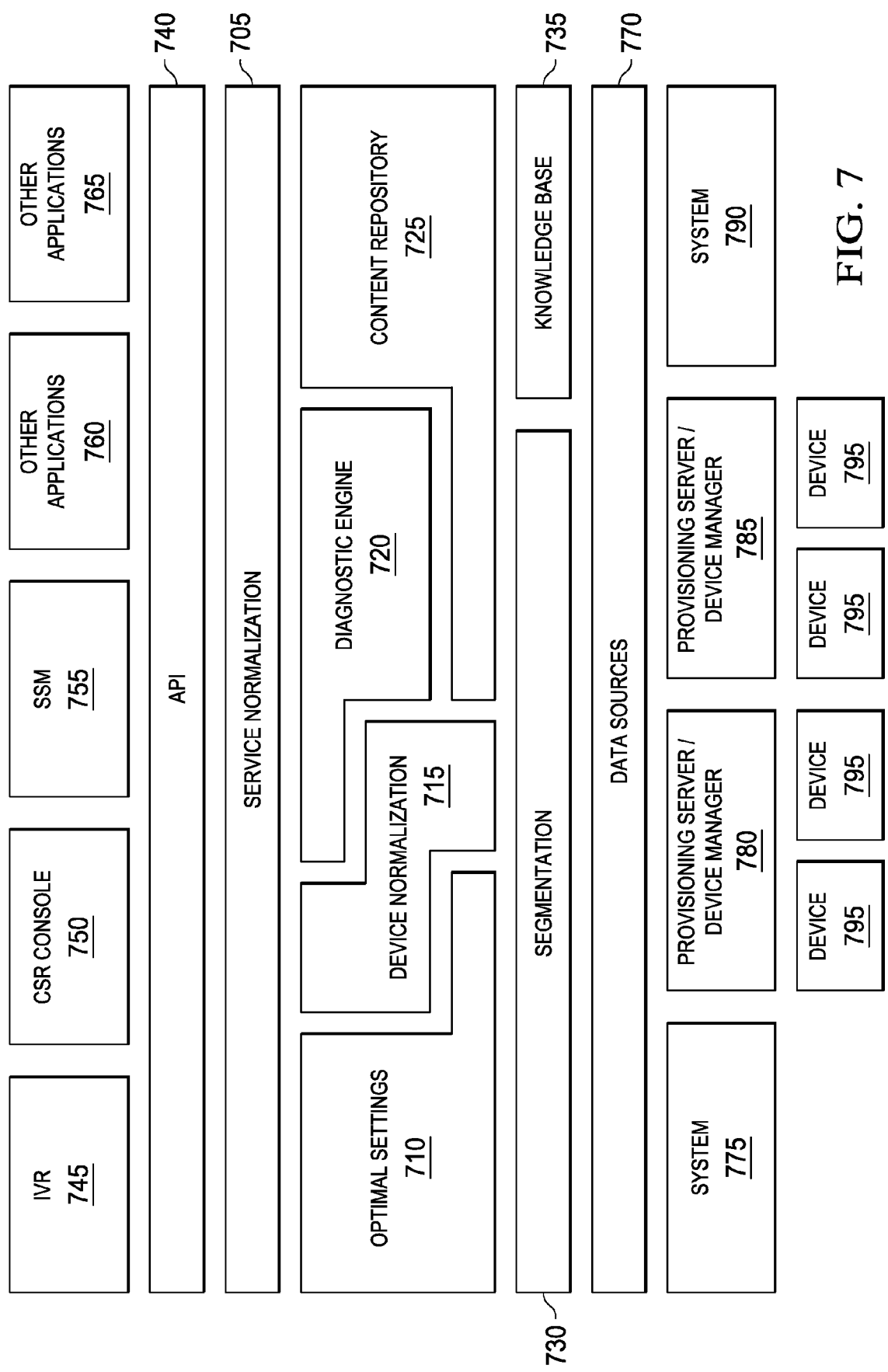
FIG. 7 is a high-level block diagram of one embodiment of a service management system.

FIG. 7 is a high-level block diagram of one embodiment of a service management system. The service management system includes a service normalization block 705 that will be described in greater detail in conjunction with FIG. 8 below. The service normalization block interacts with an optimal settings block 710, a device (and/or system) normalization block 715, a diagnostic engine block 720 and a content repository block 725. A segmentation block 730 and a knowledge base 735 interact with the optimal settings block 710, the device normalization block 715, the diagnostic engine block 720 and the content repository block 725 as shown.

The service normalization block 705 employs an application programming interface (API), allowing it to exchange information with an interactive voice response (IVR) system 745, a console 750 for a customer service representative (CSR), a Self-Service Management (SSM) application module 755 and other applications 760, 765 as may be found advantageous in a particular environment.

The optimal settings block 710 is a repository of predefined known good values used for the purposes of comparing key/value pairs to determine diagnostic and state information. The key/value pairs are also used during provisioning to set up a system or a device. The optimal settings block 710 may be regarded as a configuration repository that contains meta data about the configuration so that applications and other systems can look up known good values for the purpose of configuring (provisioning), diagnostic, and repair. The illustrated embodiment of the optimal settings block 710 is configured to define optimal values for any given key/value pair based on the context of the device, subscriber, customer, or any other segmentation scheme that could be use to define different values for the same attribute (key). These values may be used by both the script engine 830 and directly by the service management engine 805 to determine whether or not a given key/value pair is "optimal." Optimal values may fall into three categories: (1) values predefined in the context of the service as being correct, (2) values defined based by a call to an extrinsic system or by subscriber input as being correct and (3) absolute values (which is often built into the logic of the script or service description logic and not stored externally). An example of a predefined optimal value is a POP server. The subscriber is aware of its identity, and it is the same for all subscribers. An example of an absolute value is "connectivity=good." An example of a value defined by a subscriber as being correct is a password, something that the subscriber chooses and is not defined before the subscriber chooses it.

The device normalization block 715 is configured to map normalized key/value pairs to device-specific or system-specific key value pairs. Mapping may be performed by transformation, executing a script, or undertaking any other appropriate normalization mechanism.

The diagnostic engine 720 is configured to contain diagnostic rules and cause diagnostic rules to be executed in order to identify, characterize and present potential solutions to problems that may exist with devices or systems. The content repository is configured to provide a channel-independent mechanism for associating bearer (e.g., IVR voice flows, self-service portal web content and customer service articles) to diagnose a problem.

The segmentation block 730 and knowledge base 735 likewise employ a data sources abstraction layer 770, allowing it to communicate with systems 775, 790 and provisioning servers and device managers 780, 785.

Different subscribers subscribe to different levels of service and live in different locations and under different circumstances. The segmentation block 730 is configured to enable other portions of the service management system to tailor responses to a subscriber based on his level of service, location and/or circumstance.

The knowledge base 735 is configured to contain articles associated with known device, system and/or service problems. When the diagnostic engine 720 identifies a problem area or a specified problem, it may provide articles from the knowledge based 735 to an application to allow the application to provide the article in turn to a subscriber or other user for informational purposes.

The data sources abstraction layer 770 is configured to operate as a protocol implementation and adaptation layer, allowing generic logic to interact with specific devices and systems without having to employ a device-specific or system-specific protocol.

The systems 775, 790 are typically added by a particular service provider and interact with the service management system as needed. The provisioning servers and device managers 780, 785 support various devices 795 intended for use by subscribers. In the illustrated embodiment, the provisioning servers and device managers 780, 785 are management systems that manage large groups of devices that typically share the same protocol (e.g., a mobile device manager that manages 10 million phones using the OMA-DM protocol). The devices 795 are just CPE, such as phones and routers.

Figure 8:
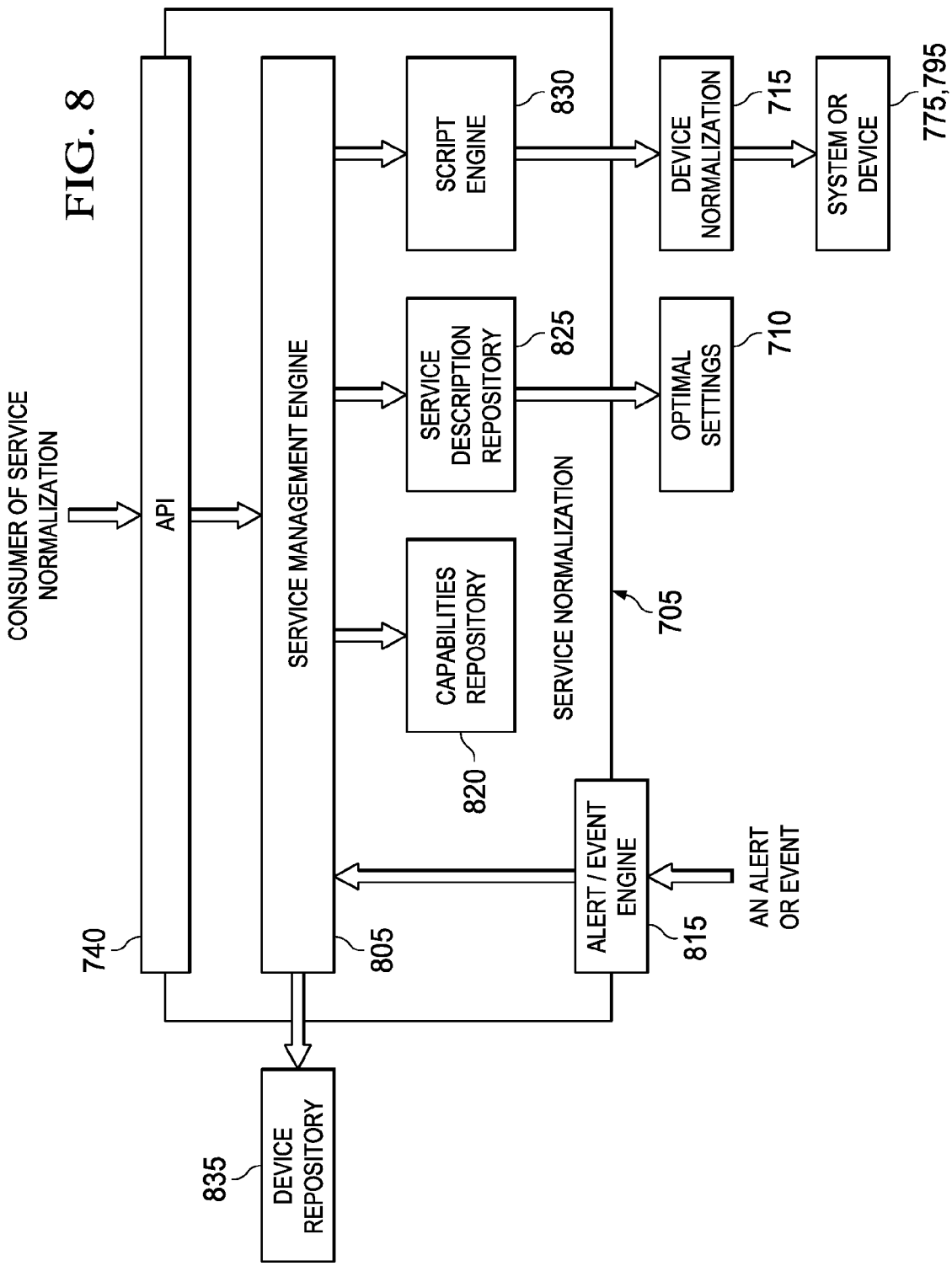
FIG. 8 is a block diagram of one embodiment of a service normalization block of FIG. 7.

FIG. 8 is a block diagram of one embodiment of the service normalization block 705. The API 740 provides a mechanism by which the service normalization block 705 may be called from within and without the service management system. By means of the API 740, subscribers may have services added (provisioned), removed (unprovisioned) modified or otherwise managed. Devices of subscribers may also be managed in the context of a particular service. Management access to key/value pairs of constituent devices and systems may also be dynamically determined and managed based on their roles in providing particular services.

A service management engine 805 enables a service provider to implement and manage services by means of the service normalization block 705 according to the various use cases described above. The illustrated embodiment of the service management engine 805 functions in two primary ways. First, the service management engine 805 manages functions defined by service descriptions. Second, the service management engine 805 provides a dynamic view of a given service.

The management of functions allows service descriptions to define named functions that can be called with contextual data derived from analyzing constituent devices and systems in their associated roles of a service.

The provision of a dynamic view of a given service enables a service description to associate key/value pairs (data) with different roles and dynamically to gather data from the devices and systems so that data can be presented without the need for intrinsic knowledge of the data that is being collected. For example, a service-view dashboard capable of creating a map of devices with their associated data of interest (each categorized by their role in the service) may employ dynamic views of services. In the illustrated embodiment, the data itself is self-describing and typically presented in tabular form.

In an alternative embodiment, the service management engine 805 is also capable of providing a view of a given service, in which case the application does have prior intrinsic knowledge regarding the data that is being collected.

The first step in managing the service is to collect a list of the devices and systems that are associated with the subscriber of the service. A device repository 835 serves this purpose. In the illustrated embodiment, the device repository is external to the service normalization block 705.

The service management engine 805 employs a capabilities repository to obtain an expanded view on the capabilities of a device so that it may map it into a role. Often the only pieces of information obtained from extrinsic systems are the unique identifier of the device, e.g., its make and model. A device may be viewed as a list of attributes (e.g., further key/value pairs). From those attributes, the capabilities of the device may be extrapolated. Extrapolation may involve expanding the known attributes of a device by deriving new attributes of a device based on the original attributes. For example, once the make and model of a system or device is obtained by means of a query, built-in rules may then be able to determine whether or not it has Wi-Fi capability.

A service description repository contains service descriptions. As described above, a service description includes at least some of: functions, key/value pairs, alerts, roles (along with their associated key/value pairs, alerts and actions) and relationships. Functions, at the service description level, can be actions exposed by a device, a script that can be executed, or a process (a series of scripts executed in a state engine).

A script engine 830 is configured to execute service-level functions. As described previously, a service-level function could be a script, a process or action (a series of scripts) or any other type of computer program. In the illustrated embodiment, the service management engine 805 retrieves a named script from a service description based on an event or request from a consumer of the service and passes it, along with a set of parameters, to the script engine 805 for execution. In the illustrated embodiment, the set of parameters includes: references to the constituent devices (categorized by role) and the service description. The script, once started, has access to the optimal values, the devices and systems (abstracted by device normalization or directly) and the service management system in general.

The service normalization block 705 has access to a capabilities repository 820. The capabilities repository 820 is configured to derive new attributes and capabilities through rules based on existing, known attributes. For example, it is known that Windows® Mobile cell phones have Internet browsers.

The service normalization block 705 employs the device normalization engine 715 configured to create an abstraction that provides a normal view of extrinsic device and systems. This allows the service description to be defined generically for devices and systems of the same class without having to include logic and cases for each device. For example, if one device is managed by OMA-DM and has an email client while another device that also has an email client is managed by Digital Subscriber Line (DSL) Forum standard TR069, both devices will have a Simple Mail Transfer Protocol (SMTP) server. However, the manner in which values are obtained can differ by protocol (OMA-DM versus TR069) and by key (the name for the value).

At least some of the systems and devices 775, 795 have the capability to generate alerts or events. The alert/event engine 815 is configured to receive these alerts or events and apply them against each service description to determine whether the alert applies to that service description. If a particular alert or event does apply to a particular service, the service management system is configured to obtain a corresponding action, script or process from the service description that may be executed to respond to the alert or event.

Remote Repair and Maintenance

With the emergence of converged devices and the desire of telecommunication operators to sell advanced services to subscribers, the need to provide ongoing support and maintenance of these services has become vital. Since the services are becoming more complex and depend on one or more devices and/or systems, the repair and maintenance of these services can be a complex task.

Described hereinafter are various embodiments of systems and methods for remotely repairing and maintaining a telecommunication service on one or more devices and/or systems. Various of the embodiments employ a predefined, rich description of a service to perform repair and maintenance of a telecommunication service based on the appropriate service description.

Through the system or method, a service provider, acting through a service management system, can remotely repair and maintain a telecommunication service on a combination of fixed and/or mobile devices using predefined service relationships. The service management system maintains relationships between a subscriber, one or more services offered to the subscriber and devices and/or systems involved in these services. As part of the service repair process, the system or method first queries the attributes (key/value pairs) from the devices and/or systems involved in this service and compares them to optimal values that are maintained by the system. Optimal values can be defined for any given key/value pair based on the context of the device, subscriber, service, or any other segmentation scheme that could be use to define different values for the same attribute (key). If any configuration settings have suboptimal values, the system or method provisions the affected devices and/or systems with new settings. The system or method can also perform automated maintenance of a service when an alert is generated from an external system.

Figure 9:
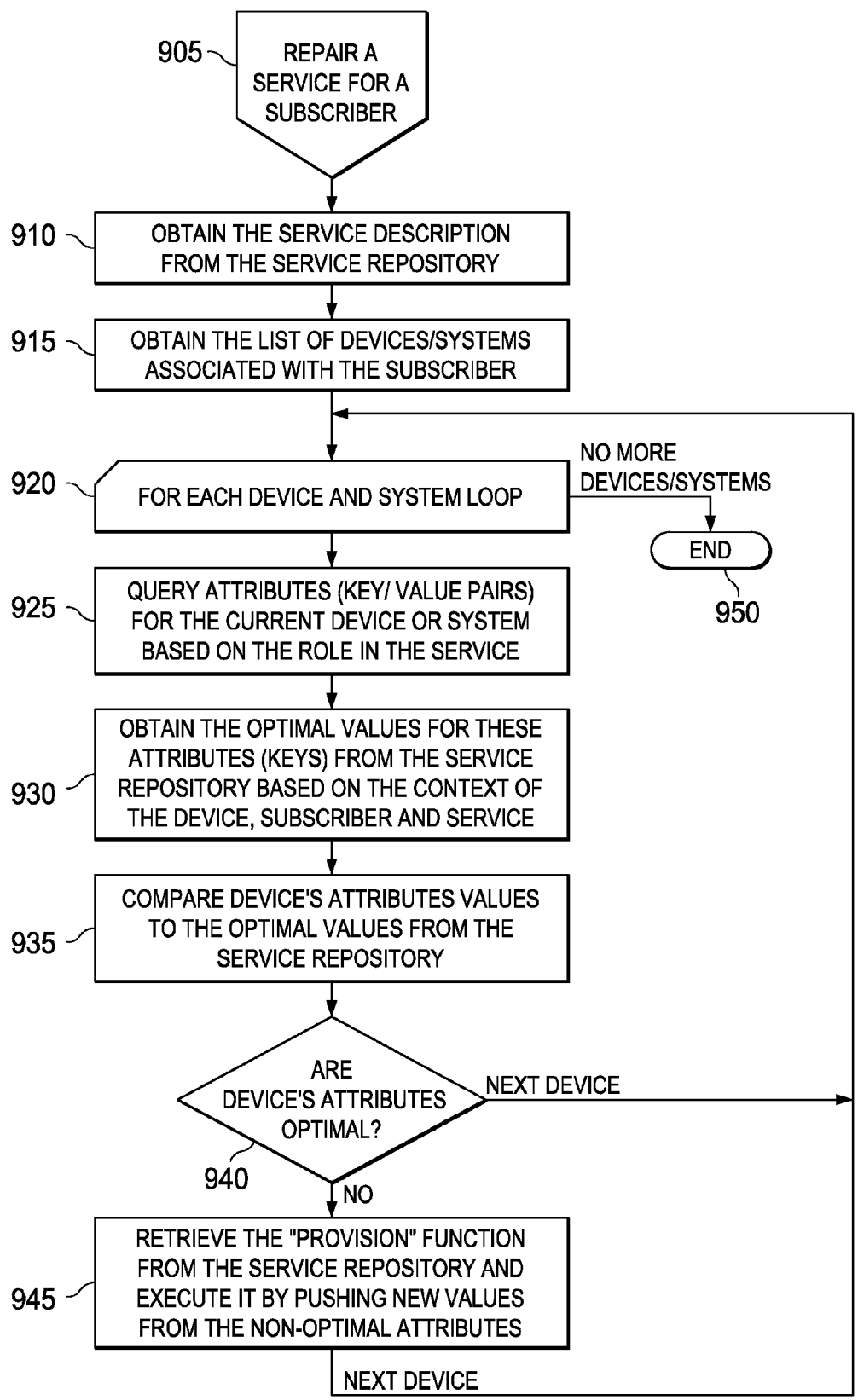
FIG. 9 is a flow diagram of one embodiment of a method of remotely repairing a telecommunication service using service relationships carried out according to the principles of the invention.

Some embodiments of a system or method for remotely repairing a telecommunication service on fixed devices or systems, mobile devices or systems, or both, using predefined service relationships will now be described. FIG. 9 is a flow diagram of one embodiment of a method of remotely repairing a telecommunication service using service relationships carried out according to the principles of the invention.

In a step 905, information identifying the subscriber and the particular service are received. In a step 910, data is retrieved from the service description corresponding to the particular service. In one embodiment, a call is made to the service management system in order to gain access to the service description and the data contained therein. As described above, a service description defines, at a high level, one or more of functions (e.g., an action exposed by a device, a script that can be executed or a process, which may be a series of scripts or any type of computer program), attributes (key/value pairs), alerts, roles (and their associated key/value pairs, alerts and actions and relationships.

In a step 915, the list of devices and systems that are associated with the subscriber of the service is obtained. The capabilities of ones of the devices and systems involved in this service are employed to obtain an expanded view of what a device can do so that it can then be mapped into a role. In a step 920, a process is repeated for each device and system associated with the subscriber.

The process includes a step 925 in which the service description is employed to determine the attributes regarding the current device or system that need to be retrieved based on its role in the service. Those attributes are then retrieved. In one embodiment, the attributes are retrieved from the device repository 835 of FIG. 8. In a step 930, the service description is employed to retrieve the optimal values for each of these device attributes (keys). In one embodiment, optimal values exist for every given key/value pair based on the context of the device, subscriber, service or any other segmentation scheme that could be used to define different values for the same attribute. In another embodiment, the optimal values are retrieved from the optimal settings block 710 of FIG. 7. In a step 935, the values of the device's attributes values are compared to the optimal values retrieved in the step 930. In a step 940, it is determined whether each of the attribute's values matches the optimal values. If they all match, the process proceeds to the next device or system in the step 920. If one or more of them do not match, a step 945 calls for one or more optimal values to be provisioned for the device or system. In one embodiment, a "provision" function is retrieved from the service description and executed. The provision function causes the optimal values to be provisioned. This process continues for each device or system playing a role in the service.

In a step 950, when all of the devices and systems associated with the service are processed, the repair of the service is regarded as being complete.

Figure 10:
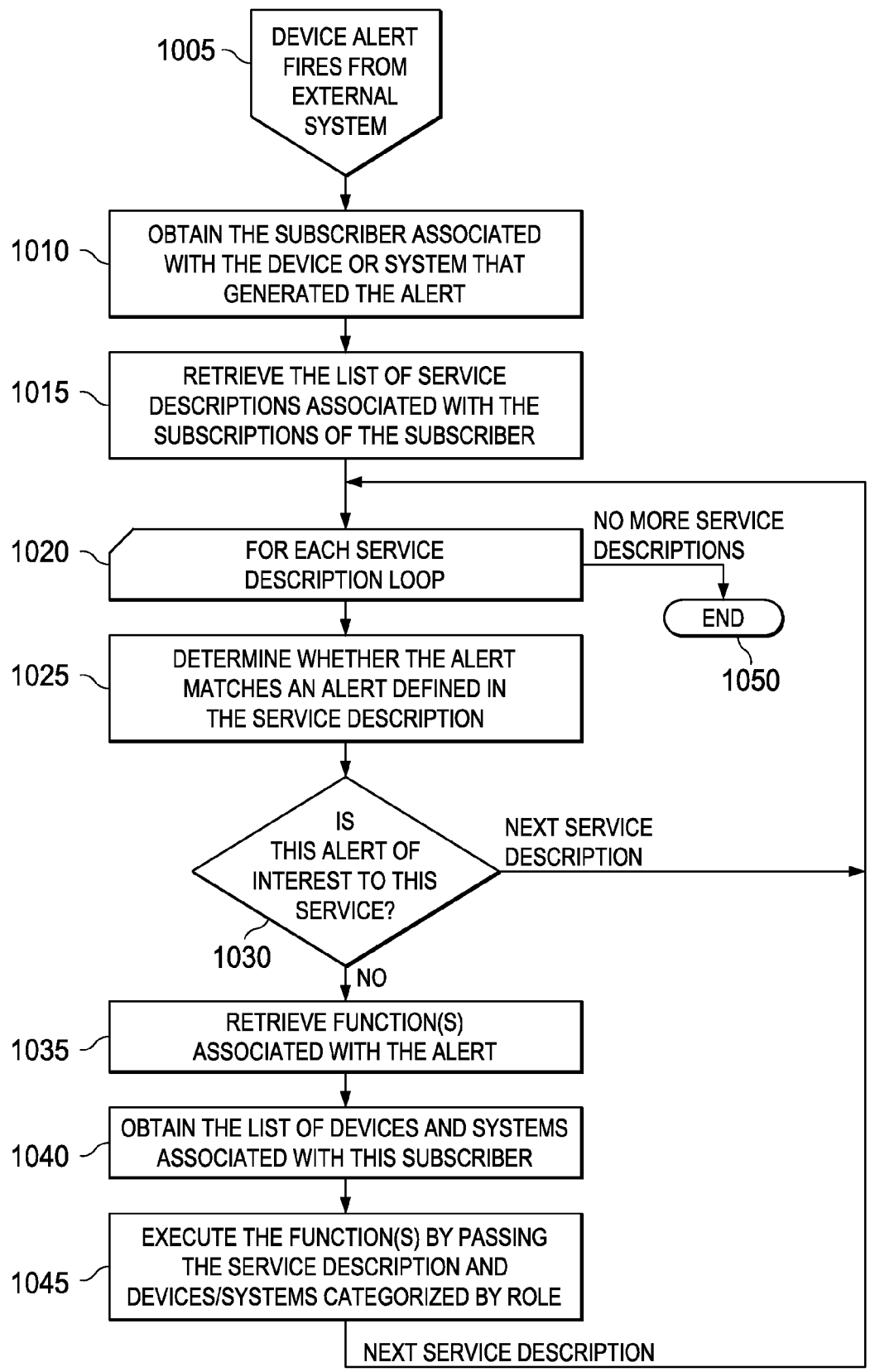
FIG. 10 is a flow diagram of one embodiment of a method of remotely maintaining a telecommunication service using service relationships carried out according to the principles of the invention.

Some embodiments of a system or method for remotely maintaining a telecommunication service on fixed devices or systems, mobile devices or systems, or both, using predefined service relationships will now be described. FIG. 10 is a flow diagram of one embodiment of a method of remotely maintaining a telecommunication service using service relationships carried out according to the principles of the invention.

In a step 1005, an alert is received that triggers automated maintenance of a service to be performed. In the illustrated embodiment, the alert is received from an external system. For example, CPE, such as an Internet gateway, may generate an alert indicating its Service Set Identifier (SSID) has changed. The alert is conveyed to the service management system that manages the CPE.

In a step 1010, a subscriber is associated with the alert. In one embodiment, the service description repository 825 of FIG. 8 is employed to identify the subscriber associated with the device that generated the alert/event. In a step 1015, the one or more subscriptions associated with the subscriber are determined. Each service description is then retrieved. In one embodiment, each service description is retrieved from the service description repository 825 of FIG. 8. In a step 1020, a process is repeated for each service description associated with the subscriber.

The process includes a step 1025 in which it is determined whether the alert matches an alert type in the current service description. If alert does not match an alert type in the current service description, the process proceeds to the next service description in the step 1020. Otherwise, if the alert matches an alert type in the current service description, one or more functions associated with the alert type are retrieved. In one embodiment, the one or more functions are retrieved from the service description. Then, in a step 1040, devices and systems pertaining to the current service description and associated with the subscriber are retrieved. In a step 1045, the one or more functions are executed. In one embodiment, the one or more functions are passed to the script engine 830 of FIG. 8. In a related embodiment, the service description and identities of the devices and systems pertaining to the current service description, associated with the subscriber and categorized by role are passed along with the one or more functions to the script engine 830 of FIG. 8.

In the example begun above, if the subscriber has a WiFi enabled mobile phone that was configured to connect to the Internet gateway using its old SSID, one function may be executed to change the SSID on the mobile phone to match the new SSID of the internet gateway.

This process continues for each service description associated with the subscriber until the alert has been fully addressed.

In a step 1050, when all of the service descriptions associated with the subscriber are processed, maintenance of the service is regarded as being complete.

Various embodiments of the system and method are configured to allow a service provider remotely to repair a telecommunication service on one or more devices and/or systems using predefined relationships between subscribers, the devices and/or systems related to a subscriber, a service description and optimal values. Optimal values may be defined for any given key/value pair based on the context of the device, subscriber, service or any other segmentation scheme that could be used to define different values for the same attribute (key). Various other embodiments are also configured automatically to maintain a telecommunication service on one or more devices and/or systems using predefined system relationships in the context of a received event. An external system may generate the event.

Those skilled in the art to which this application relates will appreciate that other and further additions, deletions, substitutions and modifications may be made to the described embodiments.

What is claimed is:

1. A service management system, comprising:
a non-transitory storage medium having a service description repository configured to contain service descriptions that define services in terms of a set of systems and devices that assume roles based on at least one of capabilities and attributes thereof, wherein each of said roles define functions, alerts, and key-value pairs of interest from each of said systems and devices in said set; and
a computing device configured to implement a service management engine coupled to said service description repository and configured to employ one of said service descriptions to repair a corresponding one of said services using a predefined relationship among a subscriber, at least one of said systems and devices and optimal values, wherein said optimal values are predefined known values used for comparing to key-value pairs from said at least one of said systems and devices to determine diagnostic and state information for said at least one of said systems and devices.

2. The service management system as recited in claim 1 wherein said service description repository associates at least some of operations, alerts, and key/value pairs with said roles.

3. The service management system as recited in claim 1 wherein said roles are based on at least some of descriptions, capabilities and attributes of said devices.

4. The service management system as recited in claim 1 wherein said service descriptions contain service descriptions expressed in a selected one of:
a human readable markup language, and
binary data representations.

5. The service management system as recited in claim 1 wherein said service descriptions contain descriptions of arbitrary relationships between said roles using one of predefined rules, dynamically obtained rules and logic.

6. A service management system, comprising:
a non-transitory storage medium having a service description repository configured to contain service descriptions that define services in terms of a set of systems and devices that assume roles based on at least one of capabilities and attributes thereof, wherein each of said roles define functions, alerts, and key-value pairs of interest from each of said systems and devices in said set; and
a computing device configured to implement a service management engine coupled to said service description repository and configured to respond to a received event by employing one of said service descriptions to maintain a telecommunication service on at least one of said systems and devices using a predefined relationship among a subscriber and at least one of said systems and devices, wherein said received event is matched with an alert in said one of said service descriptions to cause at least one function associated with said alert to be executed.

7. The service management system as recited in claim 6 wherein said service description repository associates at least some of operations, alerts, and key/value pairs with said roles.

8. The service management system as recited in claim 6 wherein said roles are based on at least some of descriptions, capabilities and attributes of said devices.

9. The service management system as recited in claim 6 wherein said service descriptions contain service descriptions expressed in a selected one of:
a human readable markup language, and
binary data representations.

10. The service management system as recited in claim 6 wherein said service descriptions contain descriptions of arbitrary relationships between said roles using one of predefined rules, dynamically obtained rules and logic.

11. A method of remotely repairing a telecommunication service, comprising:
receiving information identifying a subscriber and said service;
identifying end points associated with said subscriber;
mapping said end points into roles in said service;
repeating, for each of said end points:
determining attributes regarding said each of said end points,
retrieving said attributes and optimal values corresponding thereto, and
reprovisioning ones of said attributes based on a comparison therebetween and ones of said optimal values; and
wherein said optimal values are predefined known values used to determine diagnostic and state information for said at least one of said systems and devices and said identifying and said mapping steps are performed by a processor.

12. The method as recited in claim 11 wherein said receiving comprises retrieving data reflecting said information from a service description of a service management system.

13. The method as recited in claim 12 wherein said data comprises key/value pairs based on a particular context.

14. The method as recited in claim 11 further comprising retrieving said optimal values from an optimal settings block of a service management system.

15. The method as recited in claim 11 wherein said reprovisioning comprises retrieving a provision function from a service description of a service management system.

* * * * *